(12) United States Patent
Klein et al.

(10) Patent No.: US 12,460,041 B2
(45) Date of Patent: Nov. 4, 2025

(54) METHOD FOR IMPROVING THE FLAME, SMOKE AND/OR TOXICITY RETARDANCY IN POLYISOCYANURATE / POLYURETHANE (PIR/PUR) COMPRISING MATERIALS

(71) Applicant: Huntsman International LLC, The Woodlands, TX (US)

(72) Inventors: Rene Alexander Klein, Hoegaarden (BE); Nima Esmaeili, Etterbeek (BE); Nadja Kathrin Richter, Brussels (BE); Rajesh Kumar Gajendran, Brussels (BE); Xiaodong Guo, Mechelen (BE); Thomas Julien Joncheray, Woluwe Saint Pierre (BE); Jan Vandenbroeck, Scherpenheuvel-Zichem (BE)

(73) Assignee: HUNTSMAN INTERNATIONAL LLC

(*) Notice: Subject to any disclaimer, the term of this patent is extended or adjusted under 35 U.S.C. 154(b) by 551 days.

(21) Appl. No.: 17/785,548

(22) PCT Filed: Dec. 22, 2020

(86) PCT No.: PCT/EP2020/087582
§ 371 (c)(1),
(2) Date: Jun. 15, 2022

(87) PCT Pub. No.: WO2021/130201
PCT Pub. Date: Jul. 1, 2021

(65) Prior Publication Data
US 2023/0021509 A1   Jan. 26, 2023

(30) Foreign Application Priority Data
Dec. 23, 2019 (EP) .................................. 19219222

(51) Int. Cl.
| | | |
|---|---|---|
| *C08G 18/12* | (2006.01) | |
| *C08F 4/34* | (2006.01) | |
| *C08F 220/20* | (2006.01) | |
| *C08F 222/10* | (2006.01) | |
| *C08F 290/06* | (2006.01) | |
| *C08G 18/08* | (2006.01) | |
| *C08G 18/09* | (2006.01) | |
| *C08G 18/18* | (2006.01) | |
| *C08G 18/20* | (2006.01) | |
| *C08G 18/48* | (2006.01) | |
| *C08G 18/67* | (2006.01) | |
| *C08G 18/76* | (2006.01) | |
| *C08G 18/79* | (2006.01) | |
| *C08G 18/81* | (2006.01) | |

(Continued)

(52) U.S. Cl.
CPC .............. *C08G 18/12* (2013.01); *C08F 4/34* (2013.01); *C08F 220/20* (2013.01); *C08F 222/104* (2020.02); *C08F 290/067* (2013.01); *C08G 18/092* (2013.01); *C08G 18/14* (2013.01); *C08G 18/18* (2013.01); *C08G 18/1833* (2013.01); *C08G 18/1866* (2013.01); *C08G 18/2036* (2013.01); *C08G 18/48* (2013.01); *C08G 18/4804* (2013.01); *C08G 18/672* (2013.01); *C08G 18/673* (2013.01); *C08G 18/7664* (2013.01); *C08G 18/794* (2013.01); *C08G 18/8175* (2013.01); *C08J 9/141* (2013.01); *C08K 5/14* (2013.01); *C08G 2101/00* (2013.01); *C08G 2110/0025* (2021.01); *C08G 2115/02* (2021.01); *C08G 2350/00* (2013.01)

(58) Field of Classification Search
CPC ...... C08G 18/12; C08G 18/092; C08G 18/14; C08G 18/18; C08G 18/4804; C08G 2101/00; C08G 2115/02; C08G 2110/0025; C08G 18/672; C08G 18/673; C08G 2350/00; C08G 18/1833; C08G 18/1866; C08G 18/2036; C08G 18/48; C08G 18/794; C08G 18/8175; C08G 18/7664; C08F 222/104; C08F 290/067; C08F 220/20; C08F 4/34; C08K 5/14; C08J 9/141
See application file for complete search history.

(56) References Cited

U.S. PATENT DOCUMENTS

| | | | |
|---|---|---|---|
| 6,069,218 | A | 5/2000 | Vogt-Birnbrich |
| 2008/0125504 | A1 | 5/2008 | Reinheimer |

FOREIGN PATENT DOCUMENTS

| | | | |
|---|---|---|---|
| CN | 102585140 | A | 7/2012 |
| CN | 106674436 | A | 5/2017 |

(Continued)

OTHER PUBLICATIONS

International Search Report received in corresponding PCT Application No. PCT/EP2020/087582 completed Mar. 30, 2021 and mailed Apr. 12, 2021.

(Continued)

*Primary Examiner* — Rabon A Sergent
(74) *Attorney, Agent, or Firm* — HUNTSMAN INTERNATIONAL LLC; Lewis Craft

(57) ABSTRACT

A polyisocyanurate and/or polyurethane (PIR/PUR) comprising material having improved Flame. Smoke and/or Toxicity (FST) retardancy is disclosed and a method for forming said PIR/PUR comprising material. The PIR/PUR material is comprising at least 0.2 wt % of compounds having a number average equivalent weight<160 g/mol and at least one non-polymerized ethylenically unsaturated moiety based on the total weight of the PIR/PUR comprising material, and optionally 0.01 wt % up to 1 wt % of one or more radical initiator compounds based on the total weight of the PIR/PUR comprising material.

18 Claims, 1 Drawing Sheet

(51) Int. Cl.
  *C08G 101/00* (2006.01)
  *C08J 9/14* (2006.01)
  *C08K 5/14* (2006.01)

(56) References Cited

FOREIGN PATENT DOCUMENTS

| | | | |
|---|---|---|---|
| JP | H11-509887 | A | 8/1999 |
| JP | 2000-109538 | A | 4/2000 |
| JP | 2002-249533 | A | 9/2002 |
| JP | 2009-263647 | A | 11/2009 |
| JP | 2012-021037 | A | 2/2012 |
| JP | 2013-227519 | A | 11/2013 |
| JP | 2015-067684 | A | 4/2015 |
| JP | 2015-199937 | A | 11/2015 |
| JP | 2016006161 | A | 1/2016 |
| JP | 2017-082165 | A | 5/2017 |
| JP | 2019-536880 | A | 12/2019 |
| JP | 2020-037681 | A | 3/2020 |
| JP | 2020-037682 | A | 3/2020 |
| JP | 2020-037683 | A | 3/2020 |
| JP | 2020-063439 | A | 4/2020 |
| KR | 20190071610 | A | 6/2019 |
| WO | 1997039836 | A1 | 10/1997 |
| WO | 2018104221 | A1 | 6/2018 |
| WO | 2019219503 | A1 | 11/2019 |

OTHER PUBLICATIONS

Written Opinion received in corresponding PCT Application No. PCT/EP2020/087582 completed Mar. 30, 2021 and mailed Apr. 12, 2021.
Office Action issued Oct. 12, 2023 for Corresponding Chinese Application No. 202080089286.9.

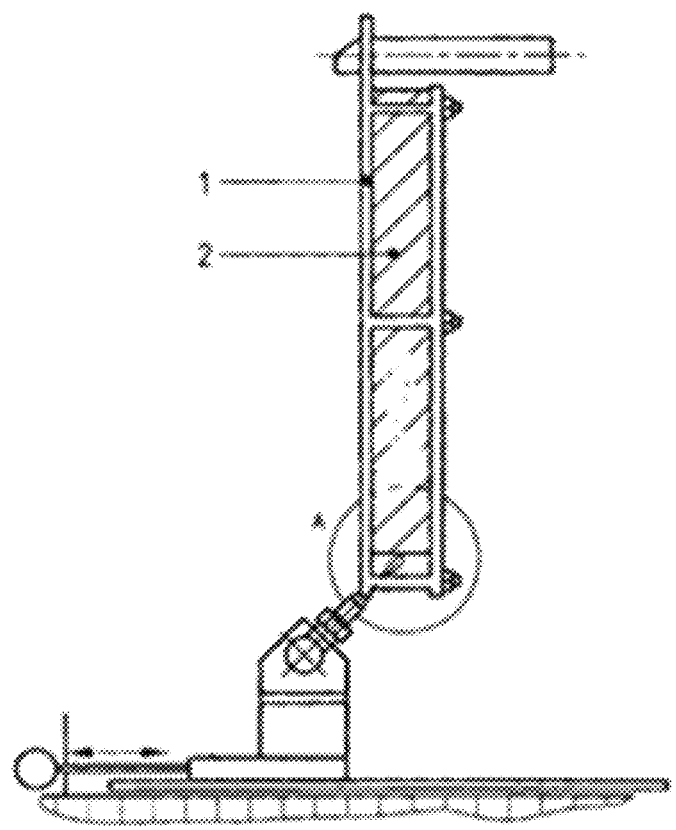

METHOD FOR IMPROVING THE FLAME, SMOKE AND/OR TOXICITY RETARDANCY IN POLYISOCYANURATE / POLYURETHANE (PIR/PUR) COMPRISING MATERIALS

CROSS-REFERENCE TO RELATED APPLICATIONS

This application is the National Phase of International Application PCT/EP2020/087582 filed Dec. 22, 2020 which claims priority to EP Provisional application Ser. No. 19/219,222.7 filed Dec. 23, 2019. The noted applications are incorporated herein by reference.

FIELD OF INVENTION

The present invention is related to a method for improving the Flame, Smoke and/or Toxicity (FST) retardancy in polyisocyanurate and/or polyurethane (PIR/PUR) comprising materials.

The present invention further relates to polyisocyanurate and/or polyurethane (PIR/PUR) comprising materials comprising significant amounts of compounds having at least one non-polymerized ethylenically unsaturated moiety.

More in particular, the invention relates to polyisocyanurate and/or polyurethane (PIR/PUR) comprising materials comprising significant amounts of acrylate, methacrylate, acrylic acid, methacrylic acid, allyl alcohol and/or maleic acid and derivatives thereof having at least one non-polymerized ethylenically unsaturated moiety.

BACKGROUND

Halogen containing additives have been traditionally used as fire-retardant in organic resins. That is, the additive compounds contain either fluorine, chlorine or bromine. Brominated resins, which are the most common, are strong oxidizers. When exposed to heat, the weak bonds between the bromine and the rest of the resin's atomic structure cleaves and forms bromine radicals which interfere with extremely exothermic oxidation reactions and consequently inhibits the flame. While it is this reaction that gives brominated resins their fire-retardant properties, the bromine that is removed by this reaction then reacts with hydrogen to form hydrogen bromide (HBr). If the brominated resin is exposed to more and/or hotter flames, HBr density can increase. The resulting smoke is considerably more toxic than smoke from nonhalogenated resins.

In rigid polyurethane (PU) foams, for example, TCPP (trichloro propyl phosphate) is widely used. In many PU applications there have recently been restrictions proposed by countries such as Canada for uses in the furniture and bedding applications. Similarly, efforts are ongoing by the U.S. Environmental Protection Agency (EPA). The US Consumer Product Safety Commission (CPSC) is evaluating the potential regulation or even considers banning organo-chlorinated substances as fire retardants. The European Chemicals Agency (ECHA) has opened a public consultation in view of a restriction of TCEP, TCPP and TDCP in PU flexible foam for children articles and residential furniture and it could be broadened to other applications. Further, there is an increasing pressure on flame retardants by promoting "flame retardant free articles". In California, for example, there is a push for fire retardant free insulation boards.

Seen the recent developments there is a need to develop new solutions that not only improve the flame retardance and flame resistance of polyisocyanurate (PIR) and/or polyurethane (PUR) comprising materials but also reduce the smoke and toxicity. These alternative solutions and/or compounds should not rely on TCPP or organo-halogen substances and should be suitable for use as additives in the reactive formulations used for making polyisocyanurate (PIR) and/or polyurethane (PUR) comprising materials and which do not have a negative impact on the properties of the final obtained PIR and/or PUR comprising material. Said compounds are herein referred to as Flame, Smoke and Toxicity (FST) reducing compounds.

BRIEF DESCRIPTION OF THE DRAWINGS

FIG. 1 is an illustration of the apparatus and set-up for the Kleinbrenner Test.

GOAL OF THE INVENTION

The goal of the invention is to provide polyisocyanurate (PIR) and/or polyurethane (PUR) comprising materials having efficient and improved Flame, Smoke and/or Toxicity (FST) retardancy when exposed to fire.

The goal is achieved by the presence of Flame, Smoke and/or Toxicity (FST) reducing compounds in the PIR/PUR comprising materials.

Surprisingly we have found that certain ethylenically unsaturated compounds optionally in the presence of a radical initiator can be used as additives in PIR/PUR comprising materials to reduce the Flame, Smoke and Toxicity generation from said PIR/PUR comprising materials when exposed to fire.

Definitions and Terms

In the context of the present invention the following terms have the following meaning:
1) The expression "isocyanate index" or "NCO index" or "index" refers to the ratio of NCO-groups over isocyanate-reactive hydrogen atoms present in a formulation, given as a percentage:

$$\frac{[NCO] \times 100}{[\text{active } H \text{ atoms}]}\%$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of water, if used) present at the actual polymerisation stage are taken into account.

2) The expression "isocyanate-reactive compounds" and "isocyanate-reactive hydrogen atoms" as used herein for the purpose of calculating the isocyanate index refers to the total of active hydrogen atoms in hydroxyl and amine groups present in the isocyanate-reactive compounds; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.

3) The term "OH value" or "hydroxyl value" is a measure of the content of free hydroxyl groups in a chemical substance, usually expressed in units of the mass of potassium hydroxide (KOH) in milligrams equivalent to the hydroxyl content of one gram of the chemical substance (mg KOH/g). The analytical method used to determine hydroxyl value traditionally involves acetylation of the free hydroxyl groups of the substance with acetic anhydride in pyridine solvent. After completion of the reaction, water is added, and the remaining unreacted acetic anhydride is converted to acetic acid and measured by titration with potassium hydroxide.

4) The term "average nominal hydroxyl functionality" (or in short "functionality") is used herein to indicate the number average of hydroxyl groups per molecule of the polyol or polyol composition on the assumption that this is the number average functionality (number of active hydrogen atoms per molecule) of the initiator(s) used in their preparation although in practice it will often be somewhat less because of some terminal unsaturation.

5) The word "average" refers to number average unless indicated otherwise.

6) "Trimerization catalyst" or "PIR catalyst" as used herein refers to a catalyst being able to catalyse (promote) the formation of isocyanurate groups from polyisocyanates. This means that isocyanates can react with one another to form macromolecules with isocyanurate structures (polyisocyanurate=PIR).

7 "Polyurethane catalyst" or "PU catalyst" as used herein refers to a catalyst being able to catalyse (promote) the reaction of isocyanate groups with isocyanate reactive groups such as but not limited to the formation of polyurethane groups from polyisocyanates.

8) "Polyisocyanurate comprising material" and "PIR comprising material" as used herein refers to a material comprising more than 50 wt %, preferably more than 70 wt % and most preferably more than 85 wt % polyisocyanurate. A PIR comprising material is typically made using an isocyanate index higher than 180, preferably higher than 250.

9) "Polyurethane comprising material" and "PUR comprising material" as used herein refers to a material comprising more than 50 wt %, preferably more than 70 wt % and most preferably more than 85 wt % polyurethane. A PUR comprising material is typically made using an isocyanate index below 180, preferably using an isocyanate index in the range 80-180, more preferably using an isocyanate index in the range 90-150.

10) "Functionality" in general refers to the presence of functional groups in a compound. For monomeric acrylate compounds this refers to the amount of polymerizable acrylate groups. For isocyanate reactive compounds this refers to the amount of groups containing iso-reactive hydrogen atoms.

11) "Number average equivalent weight" when disclosed in combination with compounds having at least one non-polymerized ethylenically unsaturated moiety according to the invention (also referred herein as ethylenically unsaturated compounds) refers to the molar mass of the ethylenically unsaturated compound divided by the number of unsaturated moieties in the compound and is expressed in g/mol unsaturated moieties.

12) "Free rise density" refers to density measured on foam samples made under atmospheric conditions (in the presence of blowing agents) according to ISO 845.

13) "Ethylenically unsaturated compounds" or "compounds having ethylenically unsaturated moieties" are characterized as (limited to) compounds wherein the radical polymerization (with or without the aid of a radical initiator) occurs in a temperature range between 50° C. up to 160° C., preferably in a range of 90° C. up to 160° C. under atmospheric pressure.

14) "Radical initiators" refer to substances that can produce radical species under mild conditions (e.g. by applying heat) and promote radical reactions such as radical polymerization reactions. These substances generally possess weak bonds that have low bond dissociation energies. Typical examples are azo compounds, per oxo compound such as tert-Butyl peroxybenzoate (TBPB) and peroxides.

15) "Activation Temperature", "Onset Temperature" and "$T_{onset}$" refer to the temperature at which homopolymerization (radical polymerization) of the ethylenically unsaturated compounds starts and can be determined by Differential Scanning calorimetry (DSC).

16) "Radical polymerization" involves the formation of free radicals via decomposition of an initiator by light, temperature, or redox reaction, and their reaction leads to the formation of a polymer network. The initiator can be either the ethylenically unsaturated compound itself (autopolymerization) or optionally it can be another radical forming compound (referred to herein as radical initiator) added to the system. In the context of this invention the radical polymerization of acrylates is preferably initiated by temperature such as exotherm of the reactive compounds during the fabrication process of the material (e.g. foam) or exposure to fire optionally further activated by a radical initiator.

17) "Reaction exotherm" and "$T_{reaction}$" refer to the temperature generated during a process (e.g. the process for forming the PUR and/or PIR comprising foam according to the invention) through the exotherm of the reaction.

18) "DIN 4102-1" refers to a standard test which defines fire behaviour classes for building materials and specifies requirements and test methods for each class. When the material's fire behaviour has been determined in accordance with the standard, it divides the materials into Class A and Class B building materials:

| Building material class | | Designation |
| --- | --- | --- |
| Class A | A1 | Non-combustible materials |
|  | A2 | Non-combustible materials |
| Class B | B1 | Not easily flammable |
|  | B2 | Flammable |
|  | B3 | Easily flammable |

19) "ISO 11925" and "EN ISO 11925-2" refer to a standard test for determining the ignitability of products by direct small flame impingement under zero impressed irradiance using vertically oriented test specimens.
20) The "Kleinbrenner test" (also referred to herein as B2 test) is a small flame test where a small flame is placed for 15 seconds against the bottom edge of a (foam) sample according to EN ISO 11925-2. A piece of sample (see 2 in FIG. 1) with predefined dimensions (e.g. measuring 19 cm×9 cm×2.5 cm) is cut and all sample residue from cutting is removed using pressurized air. The test takes place inside a test chamber where the test specimen is mounted vertically. Once the foam has been placed in the metal holder (see 1 in FIG. 1), a 2 cm flame is placed at a 45° angle (see A in FIG. 1) at the bottom of the foam to ignite it.

The flame is kept there for 15 seconds to observe if and how high the sample burns. The Kleinbrenner test set up was also used herein to calculate mass loss after flame exposure to quantify the flame retardance. Ideally the test should be repeated another 5 times to obtain a reliable average value. Flame retardancy according to the invention is measured as a weight percentage mass loss of the (PIR/PUR) material after flame exposure and said weight loss is calculated on the total weight of the (PIR/PUR) material before flame exposure.
21) The "cone calorimetry test" refers to a test method for assessing materials reaction to fire. The method follows the procedure given in international standard ISO 5660-1:1993 (E). Additionally, measurements of smoke production and production of toxic gases can be performed during the test. A test sample (foam) with predefined dimensions (e.g. 100 mm×100 mm) is herein subjected to a specific irradiance level. The sample thickness should not exceed 50 mm, while the irradiation level is typically set to 25, 35 or 50 mW. The surface of the sample is heated and starts to emit pyrolysis gases that are ignited.
22) The term "room temperature" refers to temperatures of about 20° C., this means referring to temperatures in the range 18° C. to 25° C. Such temperatures will include, 18° C., 19° C., 20° C., 21° C., 22° C., 23° C., 24° C. and 25° C.
23) Unless otherwise expressed, the weight percentage (indicated as % wt or wt %) of a component in a composition refers to the weight of the component over the total weight of the composition in which it is present and is expressed as percentage.
24) The term "Open-cell" and "Open cell content" refers to open-cell content of a foamed material and is expressed in % by volume (vol %) calculated on the total volume of the foam and measured according to ASTM D6226-10 (Open-cell Content by Pycnometer).

DETAILED DESCRIPTION

The present invention will be described with respect to particular embodiments.

It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

It is to be understood that although preferred embodiments and/or materials have been discussed for providing embodiments according to the present invention, various modifications or changes may be made without departing from the scope and spirit of this invention.

The present invention provides a polyisocyanurate and/or polyurethane (PIR/PUR) comprising material having improved Flame, Smoke and/or Toxicity (FST) retardancy thereby avoiding or at least minimizing the use of state of the art organo halogen fire retardants.

It has been surprisingly observed that the addition of well-defined and selected compounds having ethylenically unsaturated moieties are very suitable as Flame, Smoke and/or Toxicity (FST) retardant compounds in a PIR/PUR comprising material. According to the invention, these well-defined compounds are added to the reactive mixture for making a PIR/PUR comprising material.

The invention therefore discloses a well-defined class of compounds having ethylenically unsaturated moieties that will act as Flame, Smoke and/or Toxicity (FST) retardant compounds in a PIR/PUR comprising material. This well-defined class of compounds is chosen such that these compounds having ethylenically unsaturated moieties will remain at least 10 wt % of non-polymerized ethylenically unsaturated moieties based on the total weight of all compounds originating from said compounds having at least one ethylenically unsaturated moiety in the PIR/PUR comprising material. This implies that after the process of making the PIR/PUR comprising material, at least 10 wt % of the total amount of compounds having ethylenically unsaturated moieties added still have non-polymerized ethylenically unsaturated moieties.

According to embodiments, the well-defined class of compounds having ethylenically unsaturated moieties are selected such that after the process of making the PIR/PUR comprising material, at least 10 wt %, preferably 10 wt % up to 90 wt %, more preferably 20 wt % up to 80 wt % and more preferably 30 wt % up to 70 wt % of the total amount of compounds having ethylenically unsaturated moieties added have non-polymerized ethylenically unsaturated moieties.

The well-defined class of compounds having ethylenically unsaturated moieties according to the invention preferably have an onset temperature for radical polymerization ($T_{onset}$) of the ethylenically unsaturated compound which is preferably 2° C. up to 40° C. lower than the maximum reaction temperature achieved during the process for making the PIR/PUR comprising material (reaction exotherm ($T_{reaction}$)).

In case a radical initiator is used in addition to the compounds having ethylenically unsaturated moieties, the onset temperature for radical polymerization ($T_{onset}$) of the ethylenically unsaturated compound in the presence of the radical initiator (if present) is preferably 2° C. up to 40° C. lower than the maximum reaction temperature achieved during the process for making the PIR/PUR comprising material (reaction exotherm ($T_{reaction}$)).

According to embodiments, the onset temperature for radical polymerization ($T_{onset}$) of the compounds having ethylenically unsaturated moieties with or without the radical initiator is preferably 2° C. up to 40° C., more preferably 5° C. up to 30° C. and most preferably 5° C. up to 15° C. lower than the maximum reaction temperature achieved during the process for making the PIR/PUR material (reaction exotherm ($T_{reaction}$)). The onset temperature for radical polymerization ($T_{onset}$) of the compounds having ethylenically unsaturated moieties with or without the radical initiator may be 5° C.-10° C., 10° C.-15° C., 15° C.-20° C., 20° C.-25° C., 25° C.-30° C., 30° C.-35° C. lower than the maximum reaction temperature achieved during the process for making the PIR/PUR material According to embodiments, the amount of compounds having ethylenically unsaturated moieties according to the invention added to a reactive mixture used to make a PIR/PUR comprising material is in the range 2 wt % up to 30 wt %, preferably 2 wt % up to 20 wt %, more preferably 2 wt % up to 15 wt % based on the total weight of the reactive mixture used to make the PIR/PUR comprising material. Examples of preferred amounts of compounds having ethylenically unsaturated moieties added to a reactive mixture are 8 wt %, 9 wt %, 10 wt %, 11 wt % and 12 wt % based on the total weight of the reactive mixture used to make the PIR/PUR material.

The invention therefore discloses a PIR/PUR comprising material having improved Flame, Smoke and/or Toxicity (FST) retardancy, said material comprising at least 0.2 wt % of compounds having at least one non-polymerized ethylenically unsaturated moiety and optionally one or more radical initiator compound. The at least 0.2 wt % of compounds having at least one non-polymerized ethylenically unsaturated moiety will act as Flame, Smoke and/or Toxicity (FST) retardants when exposed to fire and/or high temperatures (typically above 200° C.).

According to embodiments, the PIR/PUR comprising material according to the invention having improved Flame, Smoke and/or Toxicity (FST) retardancy comprises 0.2 wt % up to 27 wt %, preferably 0.4 wt % up to 24 wt %, more preferably 0.6 wt % up to 18 wt % of compounds having at least one non-polymerized ethylenically unsaturated moiety based on the total weight of the PIR/PUR comprising material and optionally one or more radical initiator compound.

According to embodiments, the PIR/PUR comprising material according to the invention is comprising:
- at least 0.2 wt % of compounds having a number average equivalent weight<160 g/mol, preferably <120 g/mol and at least one non-polymerized ethylenically unsaturated moiety based on the total weight of the PIR/PUR comprising material, and
- optionally 0.01 wt % up to 1 wt % of one or more radical initiator compounds based on the total weight of the PIR/PUR comprising material, and According to embodiments, the compounds having at least one non-polymerized ethylenically unsaturated moiety is selected or originating from compounds having at least one ethylenically unsaturated moiety and having an onset temperature for radical polymerization ($T_{onset}$) with or without the radical initiator which is preferably 2° C. up to 40° C., more preferably 5° C. up to 30° C. and most preferably 5° C. up to 15° C. lower than the maximum reaction temperature achieved during the process for making the PIR/PUR comprising material (reaction exotherm ($T_{reaction}$)).

According to embodiments, the total amount of compounds having at least one non-polymerized ethylenically unsaturated moiety and compounds originating from compounds having at least one ethylenically unsaturated moiety in the PIR/PUR comprising material is in the range 2 wt % up to 30 wt %, preferably in the range 2 wt % up to 20 wt %, more preferably in the range 2 wt % up to 15 wt % based on the total weight of the PIR/PUR comprising material.

According to embodiments, the amount of compounds having ethylenically unsaturated moieties according to the invention added to a reactive mixture used to make a PIR/PUR material is in the range 2 wt % up to 30 wt % based on the total weight of the reactive mixture and the PIR/PUR comprising material made using that reactive mixture comprises 0.2 wt % up to 27 wt % of compounds having at least one non-polymerized ethylenically unsaturated moiety based on the total weight of the PIR/PUR comprising material thereby taking into account that after the process of making the PIR/PUR comprising material 10 wt % up to 90 wt % of the total amount of compounds having ethylenically unsaturated moieties added will have non-polymerized ethylenically unsaturated moieties.

According to embodiments, the amount of compounds having ethylenically unsaturated moieties according to the invention added to a reactive mixture used to make a PIR/PUR comprising material is in the range 2 wt % up to 30 wt % based on the total weight of the reactive mixture and the PIR/PUR comprising material made using that reactive mixture comprises 0.4 wt % up to 24 wt % of compounds having at least one non-polymerized ethylenically unsaturated moiety based on the total weight of the PIR/PUR comprising material thereby taking into account that after the process of making the PIR/PUR comprising material, 20 wt % up to 80 wt % of the total amount of compounds having ethylenically unsaturated moieties added will have non-polymerized ethylenically unsaturated moieties.

According to embodiments, the amount of compounds having ethylenically unsaturated moieties according to the invention added to a reactive mixture used to make a PIR/PUR comprising material is in the range 2 wt % up to 30 wt % based on the total weight of the reactive mixture and the PIR/PUR comprising material made using that reactive mixture comprises 0.6 wt % up to 21 wt % of compounds having at least one non-polymerized ethylenically unsaturated moiety based on the total weight of the PIR/PUR comprising material thereby taking into account that after the process of making the PIR/PUR comprising material, 30 wt % up to 70 wt % of the total amount of compounds having ethylenically unsaturated moieties added will have non-polymerized ethylenically unsaturated moieties.

According to embodiments, the amount of compounds having ethylenically unsaturated moieties according to the invention added to a reactive mixture used to make a PIR/PUR comprising material is in the range 2 wt % up to 30 wt %, preferably in the range 2 wt % up to 20 wt %, more preferably in the range 2 wt % up to 15 wt % based on the total weight of the reactive mixture and the PIR/PUR comprising material made using that reactive mixture comprises 0.2 wt % up to 27 wt %, preferably 0.2 wt % up to 18 wt % and more preferably 0.2 wt % up to 13.5 wt % of compounds having at least one non-polymerized ethylenically unsaturated moiety based on the total weight of the PIR/PUR comprising material thereby taking into account that after the process of making the PIR/PUR comprising material, 10 wt % up to 90 wt % of the total amount of compounds having ethylenically unsaturated moieties added will have non-polymerized ethylenically unsaturated moieties.

According to embodiments, the PIR/PUR comprising material according to the invention comprises at least 0.2 wt % of compounds having at least one non-polymerized ethylenically unsaturated moiety based on the total weight of the PIR/PUR comprising material and optionally one or more radical initiator compound wherein the compound having at least one non-polymerized ethylenically unsaturated moiety has a number average equivalent weight<160 g/mol, preferably <120 g/mol.

According to embodiments, the PIR/PUR comprising material according to the invention comprises at least 0.2 wt % of compounds having at least one non-polymerized ethylenically unsaturated moiety based on the total weight of the PIR/PUR comprising material and optionally one or more radical initiator compound wherein the compound having at least one non-polymerized ethylenically unsaturated moiety is a monomeric compound.

According to embodiments, the PIR/PUR comprising material according to the invention comprises at least 0.2 wt % of compounds having at least one non-polymerized ethylenically unsaturated moiety based on the total weight of the PIR/PUR comprising material and optionally one or more radical initiator compound wherein the compound having at least one non-polymerized ethylenically unsaturated moiety is selected from an acrylate, methacrylate, acrylic acid, methacrylic acid allyl alcohol and/or maleic acid and derivatives or mixtures thereof.

According to embodiments, the PIR/PUR comprising material according to the invention comprises at least 0.2 wt % of compounds having at least one non-polymerized ethylenically unsaturated moiety based on the total weight of the PIR/PUR comprising material and optionally one or more radical initiator compound wherein the compound having at least one non-polymerized ethylenically unsaturated moiety is selected or originating from pentaerythritol tri-acrylate (PETA), pentaerythritol tetra-acrylate (PETRA), ethylene glycol diacrylate (EGDA), hydroxyethyl acrylate (HEA), diethylene glycol diacrylate (DEGDA), hydroxyethyl methacrylate (HEMA), ethylene glycol dimethacrylate (EGDMA) and diethylene glycol dimethacrylate (DEGDMA) and mixtures thereof.

According to embodiments, the PIR/PUR comprising material according to the invention comprises at least 0.2 wt % of compounds having at least one non-polymerized ethylenically unsaturated moiety based on the total weight of the PIR/PUR material and a radical initiator compound selected from benzoyl peroxide, t-butyl peroxybenzoate (Luperox® P), di-t-butyl peroxide (Luperox® DI), tert-butyl-hydroxyperoxide (Luperox® TBH 70X) and mixtures thereof.

According to a preferred embodiment, the compound having at least one ethylenically unsaturated moiety is selected from PETRA (Penta Erythritol Tetra Acrylate, see formula I) which is a tetrafunctional acrylate without reactive OH groups and having a molecular weight of 352 g/mol (equivalent molecular weight of 88 g/eq).

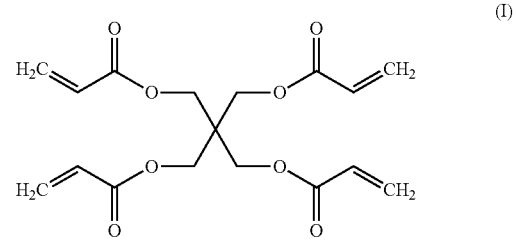 [SMILES: C=CC(=O)OCC(COC(=O)C=C)(COC(=O)C=C)COC(=O)C=C]

According to another preferred embodiment, the compound having at least one ethylenically unsaturated moiety is selected from PETRA (PentaErythritol TetraAcrylate, see formula I) and the radical initiator used in combination with PETRA is selected from Luperox® DI (tert-Butyl peroxide, see formula II) with a 10 h half-life temperature of 121° C. or Luperox® P (t-butyl peroxybenzoate, see formula III) with a 10 h half-life temperature of 103° C.

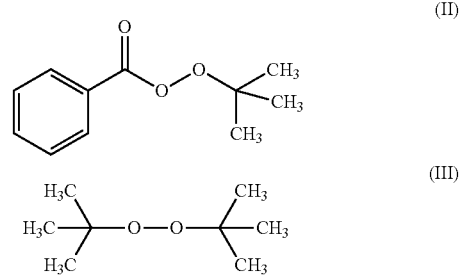

According to a preferred embodiment, the compound having at least one ethylenically unsaturated moiety is further comprising at least one isocyanate reactive moiety. During the process of making the PIR/PUR comprising material the isocyanate reactive moieties may react with the isocyanate groups in the polyisocyanate compounds and the compound having at least one ethylenically unsaturated moiety will be incorporated (cross-linked) to the PIR/PUR matrix of the PIR/PUR comprising material.

According to embodiments, the PIR/PUR comprising material according to the invention comprises at least 0.2 wt % of compounds having at least one non-polymerized ethylenically unsaturated moiety based on the total weight of the PIR/PUR comprising material and optionally one or more radical initiator compound wherein the compound having at least one non-polymerized ethylenically unsaturated moiety comprises at least 1 and preferably 2 up to 8 non-polymerized ethylenically unsaturated moieties.

According to embodiments, the PIR/PUR comprising material according to the invention comprises at least 0.2 wt % of compounds having at least one non-polymerized ethylenically unsaturated moiety based on the total weight of the PIR/PUR comprising material and optionally one or more radical initiator compound wherein the compound having at least one non-polymerized ethylenically unsaturated moiety is linked to the PIR/PUR matrix of the PIR/PUR comprising material. The linking of said compounds having at least one non-polymerized ethylenically unsaturated moiety is formed during the process of making the PIR/PUR comprising material (e.g. during foaming), said reaction taking place between isocyanate reactive groups being present in the compound having at least one non-polymerized ethylenically unsaturated moiety with isocyanates.

According to embodiments, the PIR/PUR comprising material according to the invention comprises at least 0.2 wt % of compounds having at least one non-polymerized ethylenically unsaturated moiety based on the total weight of the PIR/PUR comprising material and optionally one or more radical initiator compound wherein the compound having at least one non-polymerized ethylenically unsaturated moiety has a boiling point under atmospheric pressure higher than 150° C., preferably higher than 200° C.

According to embodiments, the PIR/PUR comprising material according to the invention comprises at least 0.2 wt % of compounds having at least one non-polymerized ethylenically unsaturated moiety and at least 0.01 wt % up to 1 wt %, preferably 0.01 wt % up to 0.5 wt % of one or more radical initiator compound based on the total weight of the PIR/PUR comprising material. Preferably the radical initiator is selected from peroxide compounds, preferably from peroxide compounds selected from benzoyl peroxide, tert-Butyl peroxide and t-butyl peroxybenzoate based on the total weight of the PIR/PUR comprising material. A radical initiator which is active at too low temperatures (e.g. too close to room temperature) is to be avoided as it will likely result in poor foam flow on top of handling safety issues.

According to embodiments, the PIR/PUR comprising material according to the invention is a polyisocyanurate (PIR) comprising foam, preferably a polyisocyanurate (PIR) comprising rigid foam.

According to embodiments, the PIR/PUR comprising material according to the invention is a polyurethane (PUR) comprising foam, preferably a polyurethane (PUR) comprising flexible or semi-flexible foam.

According to embodiments, the PIR/PUR comprising material according to the invention is a PIR/PUR comprising coating or adhesive.

According to embodiments, the PIR/PUR comprising material according to the invention is a thermoplastic polyurethane (TPU) elastomer.

The invention further discloses a method for improving the Flame, Smoke and/or Toxicity (FST) retardancy of a polyisocyanurate and/or polyurethane (PIR/PUR) comprising material, said method comprising at least combining and mixing following ingredients to form the PIR/PUR comprising material comprising:

a polyisocyanate composition comprising one or more polyisocyanate compounds; and an isocyanate-reactive composition comprising one or more isocyanate-reactive compounds; and at least one catalyst compound selected from a trimerization (PIR) catalyst and/or polyurethane (PUR) forming catalyst, and at least one compound having at least one ethylenically unsaturated moiety and having a number average equivalent weight<160 g/mol, preferably <120 g/mol, and optionally one or more radical initiator compound, and optionally a blowing agent; and optionally one or more surfactants, one or more flame retardants, one or more antioxidants, or combinations thereof characterized in that the amount of compounds having at least one ethylenically unsaturated moiety is at least 2 wt % based on the total weight of all ingredients used to make the PIR/PUR comprising material and the onset temperature for radical polymerization ($T_{onset}$) of the compounds having ethylenically unsaturated moieties with or without the radical initiator is preferably 2° C. up to 40° C., more preferably 5° C. up to 30° C. and most preferably 5° C. up to 15° C. lower than the maximum reaction temperature achieved during the process for making the PIR/PUR material (reaction exotherm ($T_{reaction}$)).

According to embodiments, the onset temperature for radical polymerization ($T_{onset}$) of the combination of the ethylenically unsaturated compound and the radical initiator (if present) is preferably 2° C. up to 40° C., more preferably 5° C. up to 30° C. and most preferably 5° C. up to 15° C. lower than the maximum reaction temperature achieved during the process for making the PIR/PUR comprising material (reaction exotherm ($T_{reaction}$)).

According to embodiments, the amount of compounds having at least one ethylenically unsaturated moiety used to make the PIR/PUR comprising material according to the invention is in the range 2 wt % up to 30 wt %, preferably in the range 2 wt % up to 20 wt %, more preferably in the range 2 wt % up to 15 wt % based on the total weight of all ingredients used to make the PIR/PUR comprising material. Examples of preferred amounts of compounds having ethylenically unsaturated moieties added to a reactive mixture are 8 wt %, 9 wt %, 10 wt %, 11 wt % and 12 wt % based on the total weight of the reactive mixture used to make the PIR/PUR material.

According to embodiments, the amount of compounds having ethylenically unsaturated moieties according to the invention added to a reactive mixture used to make a PIR/PUR comprising material is in the range 2 wt % up to 30 wt % based on the total weight of the reactive mixture and the PIR/PUR comprising material made using that reactive mixture comprises 0.2 wt % up to 27 wt % of compounds having at least one non-polymerized ethylenically unsaturated moiety based on the total weight of the PIR/PUR material thereby taking into account that after the process of making the PIR/PUR material 10 wt % up to 90 wt % of the total amount of compounds having ethylenically unsaturated moieties added will have non-polymerized ethylenically unsaturated moieties.

According to embodiments, the amount of compounds having ethylenically unsaturated moieties according to the invention added to a reactive mixture used to make a PIR/PUR comprising material is in the range 2 wt % up to 30 wt % based on the total weight of the reactive mixture and the PIR/PUR comprising material made using that reactive mixture comprises 0.4 wt % up to 24 wt % of compounds having at least one non-polymerized ethylenically unsaturated moiety based on the total weight of the PIR/PUR comprising material thereby taking into account that after the process of making the PIR/PUR comprising material, 20 wt % up to 80 wt % of the total amount of compounds having ethylenically unsaturated moieties added will have non-polymerized ethylenically unsaturated moieties.

According to embodiments, the amount of compounds having ethylenically unsaturated moieties according to the invention added to a reactive mixture used to make a PIR/PUR comprising material is in the range 2 wt % up to 30 wt % based on the total weight of the reactive mixture and the PIR/PUR material made using that reactive mixture comprises 0.6 wt % up to 21 wt % of compounds having at least one non-polymerized ethylenically unsaturated moiety based on the total weight of the PIR/PUR comprising material thereby taking into account that after the process of making the PIR/PUR comprising material, 30 wt % up to 70 wt % of the total amount of compounds having ethylenically unsaturated moieties added will have non-polymerized ethylenically unsaturated moieties.

According to embodiments, the amount of compounds having ethylenically unsaturated moieties according to the invention added to a reactive mixture used to make a PIR/PUR comprising material is in the range 2 wt % up to 30 wt %, preferably in the range 2 wt % up to 20 wt %, more preferably in the range 2 wt % up to 15 wt % based on the total weight of the reactive mixture and the PIR/PUR comprising material made using that reactive mixture comprises 0.2 wt % up to 27 wt %, preferably 0.2 wt % up to 18 wt % and more preferably 0.2 wt % up to 13.5 wt % of compounds having at least one non-polymerized ethylenically unsaturated moiety based on the total weight of the PIR/PUR comprising material thereby taking into account that after the process of making the PIR/PUR comprising material, 10 wt % up to 90 wt % of the total amount of compounds having ethylenically unsaturated moieties added will have non-polymerized ethylenically unsaturated moieties.

According to embodiments, the PIR/PUR comprising material is a polyisocyanurate (PIR) comprising material, preferably a polyisocyanurate (PIR) comprising rigid foam and the method for forming the PIR comprising material is performed at an isocyanate index of 180 or higher, more preferably at an isocyanate index higher than 250 and the catalyst compound is selected from at least one trimerisation catalyst.

According to embodiments, the PIR/PUR comprising material is a polyurethane (PUR) comprising material, preferably a polyurethane (PUR) comprising foam and the method for forming the PUR comprising material is performed at an isocyanate index in the range 80-180, more preferably at an isocyanate index in the range 90-150 and the catalyst compound is selected from at least one polyurethane catalyst.

According to embodiments, the PIR/PUR comprising material is a PIR/PUR comprising foam with an apparent density<200 kg/m$^3$ measured according to ISO 845 and having an open cell content below 50 wt %, preferably below 30 wt %, more preferably below 20 wt % by volume calculated on the total volume of the foam and measured according to ASTM D6226-10 (Open-cell Content by Pycnometer).

According to embodiments, the polyisocyanate compounds according to the invention are selected from organic polyisocyanate compounds containing a plurality of isocyanate groups including aliphatic isocyanates such as hexamethylene diisocyanate and more preferably aromatic isocyanates such as m- and p-phenylene diisocyanate, tolylene-2,4- and 2,6-diisocyanates, diphenylmethane-4,4'-diisocyanate, chlorophenylene-2,4-diisocyanate, naphthylene-1,5-diisocyanate, diphenylene-4,4'-diisocyanate, 4,4'-diisocyanate-3,3'-dimethyldiphenyl, 3-methyldiphenylmethane-4,4'-diisocyanate and diphenyl ether diisocyanate, cycloaliphatic diisocyanates such as cyclohexane-2,4- and 2,3-diisocyanates, 1-methyl cyclohexyl-2,4- and 2,6-diisocyanates and mixtures thereof and bis-(isocyanatocyclohexyl-) methane and triisocyanates such as 2,4,6-triisocyanatotoluene and 2,4,4'-triisocyanatodiphenyl ether.

According to embodiments, the polyisocyanate compounds may be selected from mixtures of polyisocyanates. For example a mixture of tolylene diisocyanate isomers such as the commercially available mixtures of 2,4- and 2,6- isomers and also the mixture of di- and higher poly-isocyanates produced by phosgenation of aniline/formaldehyde condensates. Such mixtures are well-known in the art and include the crude phosgenation products containing mixtures of methylene bridged polyphenyl polyisocyanates, including diisocyanate, triisocyanate and higher polyisocyanates together with any phosgenation by-products.

Preferred polyisocyanate compositions of the present invention are those wherein the polyisocyanate is an aromatic diisocyanate or polyisocyanate of higher functionality in particular crude mixtures of methylene bridged polyphenyl polyisocyanates containing diisocyanates, triisocyanate and higher functionality polyisocyanates. Methylene bridged polyphenyl polyisocyanates (e.g. Methylene diphenyl diisocyanate, abbreviated as MDI) are well known in the art and have the generic formula I wherein n is one or more and in the case of the crude mixtures represents an average of more than one. They are prepared by phosgenation of corresponding mixtures of polyamines obtained by condensation of aniline and formaldehyde.

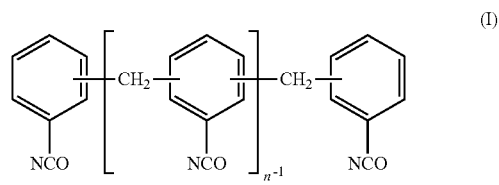

(I)

Other suitable polyisocyanate compounds may include isocyanate ended prepolymers made by reaction of an excess of a diisocyanate or higher functionality polyisocyanate with a hydroxyl ended polyester or hydroxyl ended polyether and products obtained by reacting an excess of diisocyanate or higher functionality polyisocyanate with a monomeric polyol or mixture of monomeric polyols such as ethylene glycol, trimethylol propane or butane-diol. One preferred class of isocyanate-ended prepolymers are the isocyanate ended prepolymers of the crude mixtures of methylene bridged polyphenyl polyisocyanates containing diisocyanates, triisocyanates and higher functionality polyisocyanates.

According to embodiments, the polyisocyanate compounds are selected from a toluene diisocyanate, a methylene diphenyl diisocyanate or a polyisocyanate composition comprising a methylene diphenyl diisocyanate or a mixture of such polyisocyanates.

According to embodiments, the one or more isocyanate reactive compounds include any of those known in the art for the preparation of polyisocyanurate and/or polyurethane comprising rigid foams. Of particular importance for the preparation of rigid foams are polyols and polyol mixtures having average OH values of from 50 to 1000 mg KOH/g, especially from 150 to 700 mg KOH/g, and hydroxyl (OH) functionalities of from 2 to 8, especially from 3 to 8. Suitable polyols have been fully described in the prior art and include polyether-based polyols which are reaction products of alkylene oxides, for example ethylene oxide and/or propylene oxide, with initiators containing from 2 to 8 active hydrogen atoms per molecule. Suitable initiators include: polyols, for example glycerol, trimethylolpropane, triethanolamine, pentaerythritol, sorbitol and sucrose; polyamines, for example ethylene diamine, tolylene diamine (TDA), diaminodiphenylmethane (DADPM) and polymethylene polyphenylene polyamines; and aminoalcohols, for example ethanolamine and diethanolamine; and mixtures of such initiators. Other suitable polyols include polyester based polyols obtained by the condensation of appropriate proportions of glycols and higher functionality polyols with dicarboxylic or polycarboxylic acids. Still further suitable polymeric polyols include hydroxyl terminated polythioethers, polyamides, polyesteramides, polycarbonates, polyacetals, polyolefins and polysiloxanes.

The quantities of the one or more polyisocyanate compounds and the one or more isocyanate reactive compounds to be reacted will depend upon the nature of the PIR/PUR comprising material to be produced and can be readily determined by those skilled in the art.

According to embodiments, the PIR/PUR comprising material is a foamed material and the blowing agent may be selected from isobutene, dimethyl ether, water, methylene chloride, acetone, chlorofluorocarbons (CFCs), hydrofluorocarbons (HFCs), hydrochlorofluorocarbons (HCFCs), hydrofluoroolefins (HFOs) and hydrocarbons such as pentane. The amount of blowing agent used can vary based on, for example, the intended use and application of the foam product and the desired foam stiffness and density. The blowing agent may be present in amounts from 0.5 to 60, more preferably from 1 to 45 parts by weight (pbw) per hundred weight parts isocyanate-reactive compounds (polyol).

According to embodiments, the PIR/PUR comprising material is a foamed material and the blowing agent comprises/contains water and the amount of water is preferably limited to amounts up to 15 pbw.

According to embodiments, the catalyst compound should be present in the reactive composition in a catalytically effective amount, preferably the catalyst compound is present in amounts such that the number of catalyst equivalents over the number of isocyanate equivalents ranges from 0.001 to 0.4, preferably in an amount from 0.01 to 0.26, or from 0.01 to 0.24, or from 0.02 to 0.2.

According to embodiments, one or more polyurethane catalyst compounds suitable for use herein include, but are not limited to, metal salt catalysts, such as organotins, and amine compounds, such as triethylenediamine (TEDA), N-methylimidazole, 1,2-dimethylimidazole, N-methylmorpholine, N-ethylmorpholine, triethylamine, N,N'-dimethylpiperazine, 1,3,5-tris(dimethylaminopropyl) hexahydrotriazine, 2,4,6-tris(dimethylaminomethyl) phenol, N-methyldicyclohexylamine, pentamethyldipropylene triamine, N-methyl-N'-(2-dimethylamino)-ethyl-piperazine, tributylamine, pentamethyldiethylenetriamine, hexamethyltriethylenetetramine, heptamethyltetraethylenepentamine, dimethylaminocyclohexylamine, pentamethyldipropylenetriamine, triethanolamine, dimethylethanolamine, bis(dimethylaminoethyl) ether, tris(3-dimethylamino) propylamine, or its acid blocked derivatives, and the like, as well as any mixture thereof. The catalyst compound should be present in the reactive composition in a catalytically effective amount.

According to embodiments, one or more polyisocyanurate catalyst compounds (trimerization catalysts) suitable for use herein include but are not limited to quaternary ammonium hydroxides and salts, alkali metal and alkaline earth metal hydroxides, alkoxides and carboxylates, for example potassium acetate and potassium 2-ethylhexoate, certain tertiary amines and non-basic metal carboxylates. The catalyst compound should be present in the reactive composition in a catalytically effective amount.

According to embodiments, additionally state of the art fire retardant compounds such as triethylene phosphate or expandable graphite may be added to the reactive composition used to make the PIR/PUR comprising material.

There are many different orders of adding and mixing the ingredients to form the PIR/PUR comprising material. One of skill in the art would realize that varying the order of addition of the compounds falls within the scope of the present invention.

According to embodiments, the at least one compound having at least one ethylenically unsaturated moiety and optionally the radical initiator compound(s) may be added to the isocyanate composition before combining and mixing the isocyanate composition with the isocyanate-reactive composition.

According to embodiments, the at least one compound having at least one ethylenically unsaturated moiety and optionally the radical initiator compound(s) may be added to the isocyanate-reactive composition before combining and mixing the isocyanate-reactive composition with the isocyanate composition.

According to embodiments, the at least one compound having at least one ethylenically unsaturated moiety and optionally the radical initiator compound(s) may be added to the reactive composition as a separate stream apart from the isocyanate composition and apart from the isocyanate-reactive composition.

According to embodiments, the PIR/PUR comprising material according to the invention may be used in thermal insulation, acoustic insulation and/or in structural panels such as construction thermal insulation foams or appliance thermal insulation foams in e.g. insulation panels.

EXAMPLES

Chemicals Used:
  Daltolac® R 517: Polyether polyol from Huntsman.
  Daltolac® R 251: Polyether polyol from Huntsman.
  Daltolac® R 630: Polyether polyol from Huntsman.
  Daltolac® XR 159: Polyether polyol from Huntsman.
  Cyclopentane from Merck, Germany.
  n-Pentane from Merck, Germany.
  Jeffcat® BDMA: amine catalyst from Huntsman.
  Jeffcat® ZF22: amine catalyst from Huntsman.
  Jeffcat® TR90: amine catalyst from Huntsman.
  K-ZERO 3000: Potassium catalyst in DMSO from Momentive Performance Materials.
  TEP: Triethyl phosphate from Sigma-Aldrich.
  Neopolyol 240 FR: Aromatic polyester polyol from Huntsman.
  Tegostab® B 8484: Silicon surfactant foam stabilizer from Evonic, Germany.
  Tegostab® B 8485: Silicon surfactant foam stabilizer from Evonic, Germany.
  Tegostab® B 8494: Silicon surfactant foam stabilizer from Evonic, Germany.
  SR 444D: Pentaerythritol triacrylate (PETA) from Sartomer.
  SR 295: Pentaerythritol tetraacrylate (PETRA) from Sartomer.
  Hydroxyethyl acrylate (HEA) from Sigma-Aldrich.
  SR 351: Trimethylolpropane triacrylate (TTA) from Sartomer.
  Hydroxyethyl methacrylate (HEMA) from Sigma-Aldrich.
  SR 350D: Trimethylolpropane trimethacrylate (TTMA) from Sartomer.
  Genomer® 4302: Isocyanurate trifunctional acrylate from RAHN.
  Genomer® 4622: Aromatic hexafunctional urethane acrylate from RAHN.
  Genomer® 4691: Aliphatic hexafunctional urethane acrylate from RAHN.
  Allyl alcohol from Merck.
  MA: Maleic anhydride from Merck, Germany.
  SA: Succinic anhydride from Merck, Germany.

TATA: 1,3,5-Triallyl-1,3,5-triazine-2,4,6 (1H,3H,5H)-trione, 97% from Sigma-Aldrich.

Lactic acid: DL-Lactic acid from Sigma-Aldrich (88% in water).

Luperox® P: t-butyl peroxybenzoate from Sigma-Aldrich.

Luperox® Di: di-tert butyl peroxide from Sigma-Aldrich.

Luperox® TBH70X: tert-butyl hydroperoxide from Sigma-Aldrich (70% in water)

Benzoyl peroxide: dibenzoyl peroxide from Sigma-Aldrich (75% in water).

S5025 (Suprasec® 5025): polymeric methylene diphenyl isocyanate (MDI) from Huntsman.

Fabrication of Polyurethane (PUR) Foams

Polyurethane foams were produced under free rise conditions by mixing under high shear with a Heidolph Mixer (~2500 rpm) for 5 s the polyol blend (prepared beforehand, including all chemicals listed in the tables except the isocyanate) and the Isocyanate. A thermocouple with a diameter of 1.5 mm was placed at the middle of the foaming mold, 5 cm from the bottom to record the maximum exotherm temperature of the foaming process ($T_{reaction}$) for the PUR formulations without added ethylenically unsaturated compounds (comparative examples 1 & 2). All PUR foams were stored in the fume hood overnight before being cut and characterized.

Synthesis of MDI-HEA & MDI-PETA

MIDI was placed in a three-neck round flask equipped with a mechanical stirrer and nitrogen purge and 3 ppm thionyl chloride was added as trimerization inhibitor. The flask was heated at 70° C. in an oil bath and ethylenically unsaturated compounds comprising iso-reactive groups (HEA & PETA) were added dropwise in 30 minutes. The content of the flask was kept at 70° C. for 1 hour and the product was cooled to room temperature and stored in a closed container.

Kleinbrenner Test (B2 Test)

The Kleinbrenner test is used to compare the fire retardance (FR) performance of the different samples where a small flame is placed for 15 seconds against the bottom edge of the foam sample according to EN ISO 11925-2. A piece of foam (see 2 in FIG. 1) measuring 19 cm×9 cm×2.5 cm is cut. The test takes place inside a test chamber where the test specimen is mounted vertically. Once the foam has been placed in the metal holder (see 1 in FIG. 1), a 2 cm flame is placed at a 45° angle (see A in FIG. 1) at the bottom of the foam to ignite it.

The flame is kept there for 15 seconds to observe if and how high the foam burns. In order to compare FR performance of different systems, the Kleinbrenner test was used and foam samples were weighted before and after the test to determine mass loss percentage as an indicator of FR performance. Lower mass loss indicates better flame-retardant performance.

Determination of Onset of Polymerization ($T_{Onset}$) of the Ethylenically Unsaturated Compounds Using DSC:

In order to determine the onset of polymerization ($T_{onset}$) of the ethylenically unsaturated compounds, constant heating rate differential scanning calorimetry (DSC) were conducted. DSC investigations were performed using a Q2000 TA instrument. Ethylenically unsaturated compounds were premixed with the radical initiator (if applicable) and then 3-5 mg samples were sealed in hermetic aluminium pans and were heated from 0° C. to 280° C. at 10° C./min heating rate.

Determination of Conversion Ratio ($\alpha$) of the Ethylenically Unsaturated Compounds Using DSC:

In order to determine the amount of un-reacted ethylenically unsaturated compounds (also referred to herein as compounds having non-polymerized ethylenically unsaturated moieties) in the PUR foams, isothermal differential scanning calorimetry (DSC) were conducted. DSC investigations were performed using a Q2000 TA instrument. 3 mg (±5%) ground samples were sealed in hermetic aluminium pans and were heated to 70° C. at 60° C./min heating rate and kept isothermally for 15 seconds. Then the temperature of the DSC furnace was equilibrated at 230° C. and kept isothermal for 20 minutes. The positive heat flow values are numerically integrated to estimate the total residual exotherm. The conversion ratios were calculated using $$\alpha = 100 \cdot \left(1 - \frac{RE_s - RE_{ref}}{C_{EUMs} \cdot RE_{EUMs}}\right) \quad \text{Equation 1}$$

Where $\alpha$ is the conversion ratio of the ethylenically unsaturated compounds (EUMs), REs is residual exotherm of the sample, $RE_{ref}$ is the residual exotherm of the reference foam (same formulation without the added ethylenically unsaturated compounds (EUMs)), $C_{EUMs}$ is the wt. % of the ethylenically unsaturated compounds (EUMs), and $RE_{EUMs}$ is the residual exotherm of neat ethylenically unsaturated compounds (EUMs) plus 1 wt % Luperox® Di.

A conversion ratio (a) of 60% means that 40% of the ethylenically unsaturated compounds are non-polymerized ethylenically unsaturated compounds based on the total amount of ethylenically unsaturated compounds added to the reactive composition.

Examples 1-25 According to the Invention and Comparative Example 1

Table 1 summarizes the reactive compositions used and amounts of ingredients used in parts by weight (pbw) to fabricate the examples 1-12 according to the invention and comparative example 1 as well as Kleinbrener (B2) mass loss percentages, THR (Total Heat Release), PHRR (Peak Heat Release Rate) and TSP (Total Smoke Production) of the cone calorimetry tests, $T_{reaction}$ of the base formulation (comparative example 1) and $T_{onset}$ of the ethylenically unsaturated compounds (EUMs) plus initiator if applicable.

TABLE 1

| Chemical (pbw) | Comp Ex. 1 | Ex.1 | Ex.2 | Ex. 3 | Ex.4 | Ex. 5 | Ex.6 | Ex.7 | Ex.8 | Ex.9 | Ex.10 | Ex.11 | Ex.12 |
|---|---|---|---|---|---|---|---|---|---|---|---|---|---|
| Daltolac ®R 517 | 30.5 | 30.5 | 30.5 | 30.5 | 30.5 | 30.5 | 30.5 | 30.5 | 30.5 | 30.5 | 30.5 | 30.5 | 30.5 |
| Daltolac ® R 251 | 21 | 21 | 21 | 21 | 21 | 21 | 21 | 21 | 21 | 21 | 21 | 21 | 21 |
| Daltolac ® R 630 | 21 | 21 | 21 | 21 | 21 | 21 | 21 | 21 | 21 | 21 | 21 | 21 | 21 |
| Daltolac ® XR 159 | 16 | 16 | 16 | 16 | 16 | 16 | 16 | 16 | 16 | 16 | 16 | 16 | 16 |
| Jeffcat ® BDMA | 1.5 | 1.5 | 1.5 | 1.5 | 1.5 | 1.5 | 1.5 | 1.5 | 1.5 | 1.5 | 1.5 | 1.5 | 1.5 |
| Jeffcat ® ZF 22 | 0.1 | 0.1 | 0.1 | 0.1 | 0.1 | 0.1 | 0.1 | 0.1 | 0.1 | 0.1 | 0.1 | 0.1 | 0.1 |
| Jeffcat ® TR 90 | 0.1 | 0.1 | 0.1 | 0.1 | 0.1 | 0.1 | 0.1 | 0.1 | 0.1 | 0.1 | 0.1 | 0.1 | 0.1 |

TABLE 1-continued

| Chemical (pbw) | Comp Ex. 1 | Ex.1 | Ex.2 | Ex. 3 | Ex.4 | Ex. 5 | Ex.6 | Ex.7 | Ex.8 | Ex.9 | Ex.10 | Ex.11 | Ex.12 |
|---|---|---|---|---|---|---|---|---|---|---|---|---|---|
| TEP | 6 | 6 | 6 | 6 | 6 | 6 | 6 | 6 | 6 | 6 | 6 | 6 | 6 |
| Tegostab ® B 8485 | 0.5 | 0.5 | 0.5 | 0.5 | 0.5 | 0.5 | 0.5 | 0.5 | 0.5 | 0.5 | 0.5 | 0.5 | 0.5 |
| Tegostab ® B 8494 | 1 | 1 | 1 | 1 | 1 | 1 | 1 | 1 | 1 | 1 | 1 | 1 | 1 |
| Water | 2.3 | 2.3 | 2.3 | 2.3 | 2.3 | 2.3 | 2.3 | 2.3 | 2.3 | 2.3 | 2.3 | 2.3 | 2.3 |
| Cyclopentane | 12 | 14 | 14 | 14 | 14 | 15 | 15 | 15 | 16 | 16 | 16 | 14 | 14 |
| PETRA | — | 29.35 | 29.35 | 29.35 | 29.35 | — | — | — | — | — | — | — | — |
| PETA | — | — | — | — | — | 34.56 | 34.56 | — | — | — | — | — | — |
| MDI-PETA | — | — | — | — | — | — | — | 228.21 | — | — | — | — | — |
| HEA | — | — | — | — | — | — | — | — | 38.69 | 38.69 | — | — | — |
| MDI-HEA | — | — | — | — | — | — | — | — | — | — | 280.12 | — | — |
| TTA | — | — | — | — | — | — | — | — | — | — | — | 32.84 | 32.84 |
| Luperox ® Di | — | — | 0.29 | 2.93 | — | 0.35 | — | 0.35 | 0.39 | — | 0.39 | 0.33 | — |
| Luperox ® P | — | — | — | — | 0.29 | — | — | — | — | — | — | — | — |
| S 5025 | 181.45 | 181.45 | 181.45 | 181.45 | 181.45 | 193.65 | 193.65 | — | 241.43 | 241.43 | — | 181.45 | 181.45 |
| Iso Index | 133 | 133 | 133 | 133 | 133 | 133 | 133 | 133 | 133 | 133 | 133 | 133 | 133 |
| Mass loss (%) | 31 | 14 | 5 | 8 | 10 | 6 | 15 | 5 | 10 | 17 | 8 | 7 | 16 |
| THR (MJ/m$^2$) | 22.1 | NA | 21.4 | NA | NA | NA | NA | NA | NA | NA | NA | NA | NA |
| PHRR (kW/m$^2$) | 285.3 | NA | 165.8 | NA | NA | NA | NA | NA | NA | NA | NA | NA | NA |
| TSP | 848 | NA | 397 | NA | NA | NA | NA | NA | NA | NA | NA | NA | NA |
| $T_{reaction}$ (° C.) | 130 | 130 | 130 | 130 | 130 | 130 | 130 | 130 | 130 | 130 | 130 | 130 | 130 |
| $T_{onset}$ | — | 145 | 125 | 85 | 90 | 126 | 149 | — | NA | NA | — | 105 | 145 |
| α (%) | — | 19 | 59 | 81 | 64 | NA | NA | NA | NA | NA | NA | NA | NA |

NA = not analyzed

Table 2 summarizes the reactive compositions used and amounts of ingredients used in parts by weight (pbw) to fabricate the examples 13-25 according to the invention and comparative example 1 as well as Kleinbrener (B2) mass loss percentages, $T_{reaction}$ of the base formulation (comparative example 1) and $T_{onset}$ of the ethylenically unsaturated compounds plus initiator if applicable.

Examples 26-27 According to the Invention and Comparative Example 2

Table 3 summarizes the reactive compositions used and amounts of ingredients used in parts by weight (pbw) to fabricate examples 26 and 27 according to the invention and comparative example 2 as well as Kleinbrener (B2) mass

TABLE 2

| Chemical (pbw) | Ex.13 | Ex.14 | Ex. 15 | Ex.16 | Ex. 17 | Ex.18 | Ex.19 | Ex.20 | Ex.21 | Ex.22 | Ex.23 | Ex.24 | Ex.25 |
|---|---|---|---|---|---|---|---|---|---|---|---|---|---|
| Daltolac R 517 | 30.5 | 30.5 | 30.5 | 30.5 | 30.5 | 30.5 | 30.5 | 30.5 | 30.5 | 30.5 | 30.5 | 30.5 | 30.5 |
| Daltolac R 251 | 21 | 21 | 21 | 21 | 21 | 21 | 21 | 21 | 21 | 21 | 21 | 21 | 21 |
| Daltolac R 630 | 21 | 21 | 21 | 21 | 21 | 21 | 21 | 21 | 21 | 21 | 21 | 21 | 21 |
| Daltolac XR 159 | 16 | 16 | 16 | 16 | 16 | 16 | 16 | 16 | 16 | 16 | 16 | 16 | 16 |
| Jeffcat BDMA | 1.5 | 1.5 | 1.5 | 1.5 | 1.5 | 1.5 | 1.5 | 1.5 | 1.5 | 1.5 | 1.5 | 1.5 | 1.5 |
| Jeffcat ZF 22 | 0.1 | 0.1 | 0.1 | 0.1 | 0.1 | 0.1 | 0.1 | 0.1 | 0.1 | 0.1 | 0.1 | 0.1 | 0.1 |
| Jeffcat TR 90 | 0.1 | 0.1 | 0.1 | 0.1 | 0.1 | 0.1 | 0.1 | 0.1 | 0.1 | 0.1 | 0.1 | 0.1 | 0.1 |
| TEP | 6 | 6 | 6 | 6 | 6 | 6 | 6 | 6 | 6 | 6 | 6 | 6 | 6 |
| Tegostab B 8485 | 0.5 | 0.5 | 0.5 | 0.5 | 0.5 | 0.5 | 0.5 | 0.5 | 0.5 | 0.5 | 0.5 | 0.5 | 0.5 |
| Tegostab B 8494 | 1 | 1 | 1 | 1 | 1 | 1 | 1 | 1 | 1 | 1 | 1 | 1 | 1 |
| Water | 2.3 | 2.3 | 2.3 | 2.3 | 2.3 | 2.3 | 2.3 | 2.3 | 2.3 | 2.3 | 2.3 | 2.3 | 2.3 |
| Cyclopentane | 16 | 16 | 14 | 14 | 15 | 15 | 14 | 14 | 14 | 14 | 14 | 14 | 14 |
| HEMA | 54.51 | 54.51 | — | — | — | — | — | — | — | — | — | — | — |
| TTMA | — | — | 37.57 | 37.57 | — | — | — | — | — | — | — | — | — |
| Allyl alcohol | — | — | — | — | 26.5 | 26.5 | — | — | — | — | — | — | — |
| Genomer 4302 | — | — | — | — | — | — | 29.35 | — | — | — | — | — | — |
| Genomer 4622 | — | — | — | — | — | — | — | 29.35 | — | — | — | — | — |
| Genomer 4691 | — | — | — | — | — | — | — | — | 29.35 | — | — | — | — |
| TATA | — | — | — | — | — | — | — | — | — | 27.68 | 27.68 | 27.68 | 27.68 |
| Luperox ® Di | 0.55 | — | 0.36 | — | 0.27 | — | 0.29 | 0.29 | 0.29 | — | 0.28 | 1.40 | — |
| Luperox ® TBH70X | — | — | — | — | — | — | — | — | — | — | — | — | 0.28 |
| Suprasec 5025 | 256.98 | 256.98 | 181.45 | 181.45 | 263.8 | 263.8 | 181.45 | 181.45 | 181.45 | 181.45 | 181.45 | 181.45 | 181.45 |
| Iso Index | 133 | 133 | 133 | 133 | 133 | 133 | 133 | 133 | 133 | 133 | 133 | 133 | 133 |
| Mass loss (B2) | 19 | 26 | 9 | 35 | 8 | 18 | 7 | 6 | 6 | 30 | 17 | 14 | 28 |
| $T_{reaction}$ (° C.) | 130 | 130 | 130 | 130 | 130 | 130 | 130 | 130 | 130 | 130 | 130 | 130 | 130 |
| $T_{onset}$ | NA | NA | 117 | 143 | 116 | NA | NA | 121 | 121 | 218 | 136 | 127 | 151 |

NA = not analyzed loss percentages, $T_{reaction}$ of the base formulation (comparative example 2) and $T_{onset}$ of the ethylenically unsaturated compounds plus initiator if applicable.

TABLE 3

| Chemical (pbw) | Comp Ex. 2 | Ex. 26 | Ex. 27 |
|---|---|---|---|
| Daltolac R 517 | 30.5 | 30.5 | 30.5 |
| Daltolac R 251 | 21 | 21 | 21 |
| Daltolac R 630 | 21 | 21 | 21 |
| Daltolac XR 159 | 16 | 16 | 16 |
| Jeffcat BDMA | 1.5 | 1.5 | 1.5 |
| Jeffcat ZF 22 | 0.1 | 0.1 | 0.1 |
| Jeffcat TR 90 | 0.1 | 0.1 | 0.1 |
| TEP | 6 | 6 | 6 |
| Tegostab B 8485 | 0.5 | 0.5 | 0.5 |
| Tegostab B 8494 | 1 | 1 | 1 |
| Water | 2.3 | 2.3 | 2.3 |
| Cyclopentane | 19.5 | 19.5 | 19.5 |
| SA | 48.47 | — | — |
| MA | — | 48.47 | 48.47 |
| Luperox ® Di | — | — | 0.29 |
| Suprasec 5025 | 181.45 | 181.45 | 181.45 |
| Iso Index | 133 | 133 | 133 |
| Mass loss (%) | 17.0 | 9.2 | 8.4 |
| $T_{reaction}$ (° C.) | 154 | 154 | 154 |
| $T_{onset}$ | — | NA | NA |

NA = not analyzed

From Table 1 it is clear that all investigated acrylates (examples 1-12) reduce the mass loss in B2 compared to comparative example 1, both in presence and absence of thermal initiators. In the case of PETRA where various loads of radical initiator were tested (examples 1-4) and conversion ratio (a) were evaluated, the best result (lowest mass loss in B2 test) were herein obtained in the formulation in which the $T_{onset}$ was 5° C. lower than the $T_{reaction}$ (0.1% Luperox® Di) with conversion ratio equal to ca. 59% (meaning that there is 41% of non-polymerized PETRA left based on the total amount of PETRA added to the reactive formulation). For all other acrylates used here (examples 5-12), adding 0.1% Luperox® Di reduced the mass loss of B2. Cone calorimetry results also show significant improvement in term of total smoke production (TSP) and peak heat release rate (PHRR).

From Table 2 it is clear that all investigated ethylenically unsaturated compounds in presence of 0.1% Luperox® Di, reduce the mass loss for B2, while in the case of TATA, —which in absence of radical initiator, has a significantly higher $T_{onset}$ compared to the $T_{reaction}$ (216° C. vs. 130° C.)—it only improves the flame retardant performance in presence of Luperox® Di which reduces the $T_{onset}$ to 136° C. which is closer to the $T_{reaction}$ (130° C.).

Table 3 shows that by replacing succinic anhydride (SA) with maleic anhydride (MA), —which has the similar structure as SA plus an ethylenically unsaturation—mass loss of B2 reduces from 17% for the comparative example 2 to ca. 9% for the example 26. Also, adding the thermal initiator, Luperox® Di, further reduces the mass loss to ca. 8% for the example 27.

The invention claimed is:

1. A polyisocyanurate and/or polyurethane (PIR/PUR) comprising material that comprises:
at least 0.2 wt % of ethylenically unsaturated compounds based on the total weight of the PIR/PUR comprising material, said compounds having a number average equivalent weight<160 g/mol and having at least one non-polymerized ethylenically unsaturated moiety, and optionally 0.01 wt % up to 1 wt % of one or more radical initiator compounds based on the total weight of the PIR/PUR comprising material and
wherein the compounds having at least one non-polymerized ethylenically unsaturated moiety are selected or originating from compounds having at least one ethylenically unsaturated moiety and having an onset temperature for radical polymerization ($T_{onset}$) with or without the radical initiator which is 2° C. up to 40° C., lower than the maximum reaction temperature achieved during the process for making the PIR/PUR comprising material ($T_{reaction}$).

2. The PIR/PUR comprising material according to claim 1, wherein the compounds having at least one non-polymerized ethylenically unsaturated moiety are selected or originating from compounds having at least one ethylenically unsaturated moiety and having an onset temperature for radical polymerization ($T_{onset}$) with or without the radical initiator which is 5° C. up to 30° C. lower than the maximum reaction temperature achieved during the process for making the PIR/PUR comprising material ($T_{reaction}$).

3. The PIR/PUR comprising material according to claim 1, wherein the total amount of compounds having at least one non-polymerized ethylenically unsaturated moiety and compounds originating from compounds having at least one ethylenically unsaturated moiety in the PIR/PUR comprising material is in the range 2 wt % up to 30 wt %, based on the total weight of the PIR/PUR comprising material.

4. The PIR/PUR comprising material according to claim 1, wherein the amount of compounds having at least one non-polymerized ethylenically unsaturated moiety is in the range 0.2 wt % up to 27 wt % based on the total weight of the PIR/PUR comprising material.

5. The PIR/PUR comprising material according to claim 1, wherein the compound having at least one non-polymerized ethylenically unsaturated moiety is selected from an acrylate, methacrylate, acrylic acid, methacrylic acid, allyl alcohol, maleic acid, or mixtures thereof.

6. The PIR/PUR comprising material according to claim 1, wherein the compound having at least one non-polymerized ethylenically unsaturated moiety comprises 2 to 8 non-polymerized ethylenically unsaturated moieties.

7. The PIR/PUR comprising material according to claim 1, wherein the compound having at least one non-polymerized ethylenically unsaturated moiety is selected or originating from pentaerythritol tri-acrylate (PETA), pentaerythritol tetra-acrylate (PETRA), ethylene glycol diacrylate (EGDA), hydroxyethyl acrylate (HEA), diethylene glycol diacrylate (DEGDA), hydroxyethyl methacrylate (HEMA), ethylene glycol dimethacrylate (EGDMA) and diethylene glycol dimethacrylate (DEGDMA).

8. The PIR/PUR comprising material according to claim 1, wherein the compounds having at least one non-polymerized ethylenically unsaturated moiety and/or the compounds originating from compounds having at least one ethylenically unsaturated moiety are originating from compounds comprising at least one isocyanate reactive moiety.

9. The PIR/PUR comprising material according to claim 1, wherein the compound having at least one non-polymerized ethylenically unsaturated moiety has a boiling point under atmospheric pressure higher than 150° C.

10. The PIR/PUR comprising material according to claim 1, wherein the radical initiator is selected from peroxide compounds.

11. A method comprising at least combining and mixing following ingredients to form a polyisocyanurate and/or polyurethane (PIR/PUR) comprising material comprising:

a polyisocyanate composition comprising one or more polyisocyanate compounds; and an isocyanate-reactive composition comprising one or more isocyanate-reactive compounds; and at least one catalyst compound selected from a trimerization (PIR) catalyst and/or polyurethane (PUR) forming catalyst, and at least one compound having at least one ethylenically unsaturated moiety and having a number average equivalent weight<160 g/mol, and optionally one or more radical initiator compound, and optionally a blowing agent; and optionally one or more surfactants, one or more flame retardants, one or more antioxidants, or combinations thereof; and characterized in that the amount of compounds having at least one ethylenically unsaturated moiety is at least 2 wt % based on the total weight of all ingredients used to make the PIR/PUR comprising material and the onset temperature for radical polymerization ($T_{onset}$) of the combination of the ethylenically unsaturated compound and the radical initiator (if present) is 2° C. up to 40° C. lower than the maximum reaction temperature achieved during the process for making the PIR/PUR comprising material (reaction exotherm ($T_{reaction}$)), and wherein, after forming the PIR/PUR comprising material, the PIR/PUR comprising material comprises 0.2 wt % up to 27 wt % of un-reacted compounds of the at least one compound having at least one ethylenically unsaturated moiety based on the total weight of the PIR/PUR comprising material.

12. The method according to claim 11, wherein the onset temperature for radical polymerization ($T_{onset}$) of the combination of the ethylenically unsaturated compound and the radical initiator (if present) is 5° C. up to 30° C. lower than the maximum reaction temperature achieved during the process for making the PIR/PUR material (reaction exotherm ($T_{reaction}$)).

13. The method according to claim 11, wherein the amount of compounds having at least one ethylenically unsaturated moiety is in the range 2 wt % up to 30 wt % based on the total weight of all ingredients used to make the PIR/PUR comprising material.

14. The method according to claim 11, wherein the PIR/PUR comprising material is a polyisocyanurate (PIR) comprising material and the method for forming the PIR comprising material is performed at an isocyanate index of 180 or higher and the catalyst compound is selected from at least one trimerisation catalyst.

15. The method according to claim 11, wherein the PIR/PUR comprising material is a polyurethane (PUR) comprising material and the method for forming the PUR comprising material is performed at an isocyanate index in the range 80-180 and the catalyst compound is selected from at least one polyurethane catalyst.

16. The method according to claim 11, wherein the at least one compound having at least one ethylenically unsaturated moiety comprises acrylic acid, methacrylic acid, allyl alcohol, maleic anhydride, or mixtures thereof.

17. The method according to claim 11, wherein the at least one compound having at least one ethylenically unsaturated moiety comprises at least one isocyanate reactive moiety.

18. The method according to claim 11, wherein 20 wt % up to 80 wt % of the total amount of the at least one compound having at least one ethylenically unsaturated moiety still have a non-polymerized ethylenically unsaturated moiety after forming the PIR/PUR comprising material.

* * * * *